July 25, 1944.　　　G. P. BOSOMWORTH　　　2,354,431
AUTOMATIC CONTROL DEVICE
Filed May 6, 1941　　　2 Sheets-Sheet 1
FIG. I
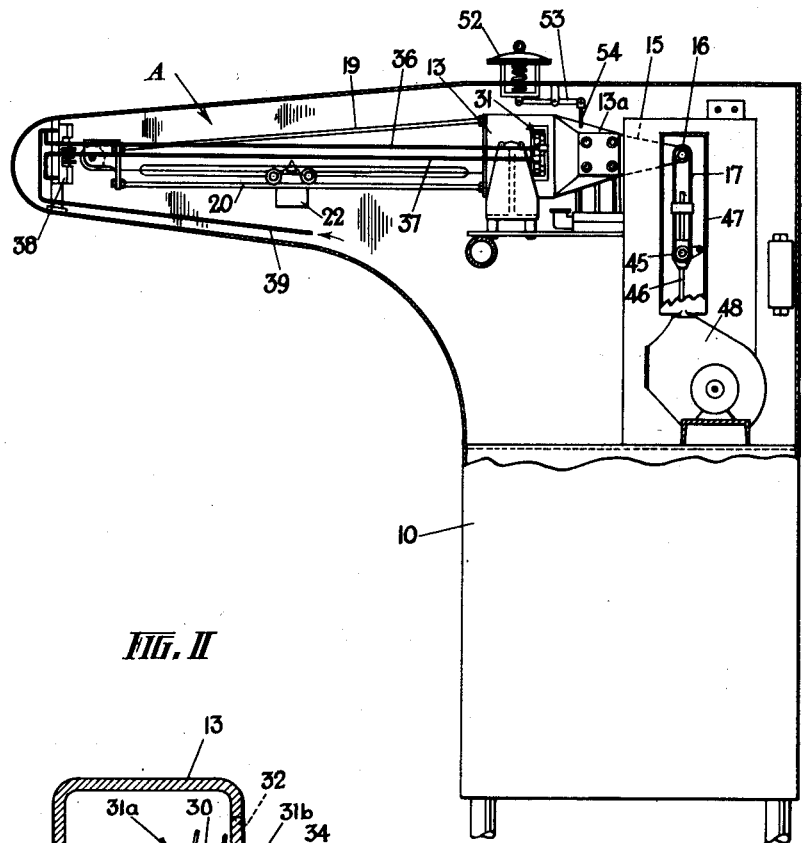
FIG. II
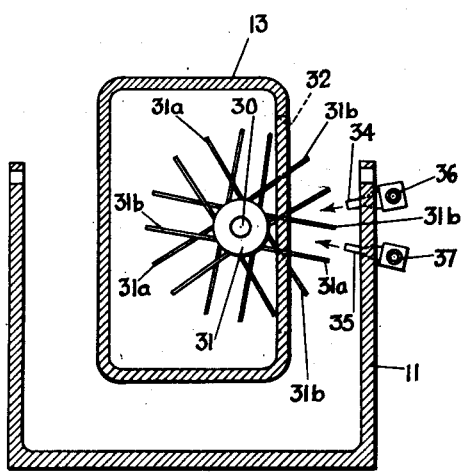
INVENTOR
GEORGE P. BOSOMWORTH
BY
ATTORNEYS

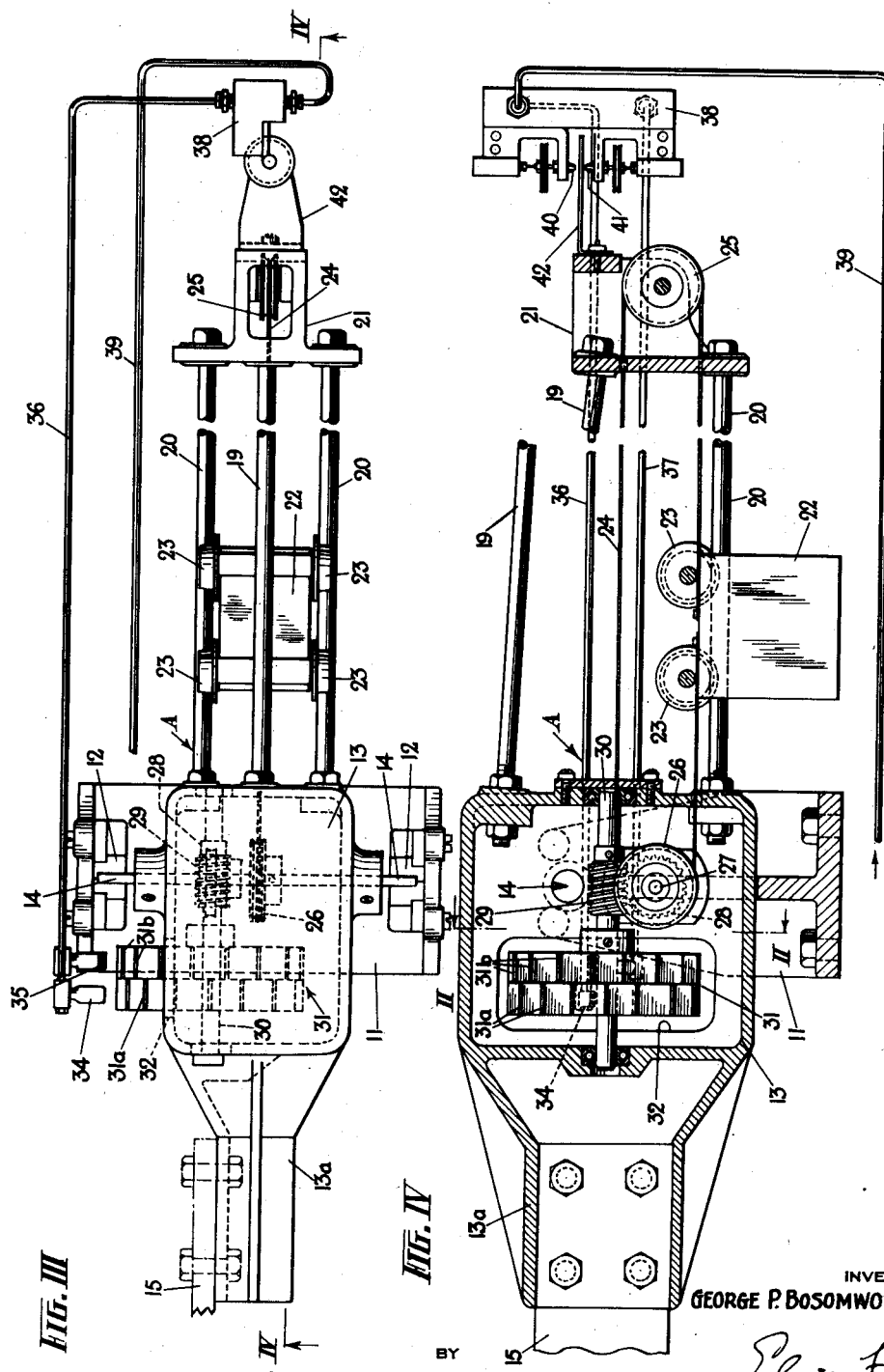

Patented July 25, 1944

2,354,431

UNITED STATES PATENT OFFICE 2,354,431

AUTOMATIC CONTROL DEVICE

George P. Bosomworth, Akron, Ohio, assignor to The Firestone Tire & Rubber Company, Akron, Ohio, a corporation of Ohio Application May 6, 1941, Serial No. 392,065

9 Claims. (Cl. 265—56)

This invention relates to automatic control devices, and more especially it relates to mechanism adapted to control or maintain a movable element within fixed limits of movement.

The invention has a wide range of utility and is especially adapted for use in apparatus such as employs a beam balance. An illustrative embodiment of the invention is shown and described herein as an operative part of an apparatus for determining the tensile properties of an elastic work piece.

The chief objects of the invention are to provide a device of the character mentioned that is automatic in operation; and that is more sensitive than similar devices heretofore provided. More specifically the invention aims to provide a beam balance having means for propelling the counterpoise back and forth along the beam thereof, which means has no mechanical connection with the beam. Other objects will be manifest as the description proceeds.

Of the accompanying drawings:

Fig. I is a rear elevation of a testing apparatus embodying the invention, a part thereof being broken away;

Fig. II is a section on the line II—II of Fig. IV showing a detail of a pneumatically driven wheel;

Fig. III is a plan view of the beam or arm of the balance mechanism of the apparatus; and Fig. IV is a section on the line IV—IV of Fig. III.

Referring to the drawings, there is shown a housing 10 that is constructed over a suitable framework, and mounted upon said framework, interiorly of the housing and in the upper region thereof, is a two-arm bracket or cradle 11, which cradle has agate bearings 12, 12 mounted atop of its respective arms. Supported upon the bearings 12, between the same, is a balance beam that is designated as a whole by a character A, said beam comprising a hollow, hub-like, axial portion 13 that carries a knife-edge pivot 14, the latter projecting from opposite sides of said portion 13 and engaging with the respective bearings 12, whereby the beam may oscillate thereabout as a fulcrum. On one side the hub portion 13 of the beam is formed with a laterally extending formation 13a to which is secured an extension 15, the free end of the latter carrying a roller 16, Fig. I, to which one end of an endless, elastic work-piece 17 may be secured. Means presently to be described is provided for engaging the other end of the work-piece to maintain the same under tension, the arrangement being such as to exert a downward pull on this end of the beam.

Extending laterally from the beam-hub 13, on the side thereof opposite the formation 13a, are three rods 19, 20, 20, the outer ends of which are connected to a bracket 21, said rods constituting a support for said bracket. The rod 19 is disposed above the rods 20, the latter being disposed parallel to each other in the same substantially horizontal plane. The rods 20 constitute a support and trackway for a counterpoise 22 that is provided with pairs of flanged wheels 23, 23 at the top thereof, said wheels resting upon the respective rods 20 and the counterpoise being disposed between the rods. The counterpoise 22 is movable back and forth along the rods 20, and for effecting such movement a cable 24 is provided, the respective ends of the cable being secured to the top face of said counterpoise. Intermediate its ends the cable is trained about an idler pulley 25 that is journaled in the bracket 21, and about a driven pulley 26 that is mounted upon a shaft 27 that is journaled within the beam hub 13, parallel to the pivot member 14 and below the latter. For driving the shaft 27, a worm wheel 28 is mounted thereon laterally of pulley 26, and meshed with said worm wheel is a worm 29 that is mounted upon a shaft 30, the latter being journaled within the beam hub 13 at right angles to the shaft 27. Also mounted upon the shaft 30 is a paddle wheel 31 that has two sets of non-radial vanes 31a, 31b arranged in side-by-side circumferential series, the vanes of one series being inclined in the opposite direction to the vanes of the other series, as is best shown in Figure II, said paddle wheel constituting the rotor of a reversible rotary air motor. The rear wall of the beam hub 13 is formed with an aperture 32 through which the vanes of the paddle wheel 31 extend.

The paddle wheel 31 is driven alternatively in opposite directions, the arrangement being such as to drive the pulley 26, through the agency of shaft 30, worm gearing 29, 28, and shaft 27, and thereby to move the counterpoise 22 along the rods 20. For driving the paddle wheel 31, pneumatic means is employed, there being a nozzle 34 directed toward the vanes 31a of the paddle wheel and a nozzle 35 directed toward the vanes 31b of the paddle wheel. The nozzles 34, 35 are so angularly disposed as to utilize the inclination of the respective vanes of the paddle wheel to best advantage. The nozzles 34, 35 are mounted upon the delivery ends of respective fluid pressure conductor pipes 36, 37, the latter and their nozzles having no physical connection with the beam A or parts carried thereby. Said pipes extend to respective discharge ports of a manifold 38, which manifold has connection, through the agency of a supply pipe 39, with a suitable source of pneumatic pressure (not shown). Carried by the manifold 38 is a pair of Foxboro air relay valves 40, 41 that are disposed in axial alignment with their confronting ends in spaced apart relation. The Foxboro valves, 40, 41 are well known articles of commerce, and no detail description thereof will be required herein, it being sufficient to note that exceedingly fine jets of air normally are discharged from their confronting ends, and that the shutting off of these jets actuates the respective valve elements thereof. As shown in Fig. I, the manifold 38 is mounted upon the framework of the housing 10 beyond that end of the balance beam A that is remote from the work piece 17, the relay valves 40, 41 of the manifold being located on the side thereof that confronts the bracket 21 on the adjacent end of said beam. An operating finger 42 secured to the outer end of bracket 21 extends between the adjacent ends of the relay valves 40, 41, the arrangement being such that as the balance beam A oscillates upon its fulcrum, the rise and fall of the operating finger 42 obstructs or modulates the air jet from one or the other of the valves 40, 41 and thus causes a jet of air under variable pressure to be discharged from nozzle 34, or nozzle 35 of the air motor. If valve 40 is actuated, air is discharged from nozzle 34 and paddle wheel 31 is rotated in the direction which results in movement of the counterpoise 22 toward the outer end of the beam A, which movement continues until the pull on the opposite end of the beam is overcome, and the finger 42 descends. This effects the gradual shutting off of the pressure fluid to nozzle 34, and as the descending finger 42 actuates valve 41, air is discharged from nozzle 35 to turn paddle wheel 31 in the direction that moves counterpoise 22 back toward the fulcrum of the beam, which movement is of very brief duration since the counterpoise quickly passes the point where the beam is in equilibrium, and the valve-operating end of the beam rises again. The operations described are then repeated, it being characteristic of the device that the finger 42 moves rapidly up and down, actuating valves 40, 41 in alternation, when equilibrium of the beam is established, the interval between actuations of plungers 40, 41 being so brief as to effect only slight movement of the counterpoise 22, and suitable calibration (not shown) on the housing of the device may be provided for denoting the location of the counterpoise when equilibrium is established. The feature of having the beam move upon its pivot as described increases the sensitivity and accuracy of the device by reducing friction at the pivot, since dynamic friction is less than static friction. Preferably the constituent elements of the beam A, with the exception of the counterpoise 22, are composed of aluminum to reduce weight and inertia, the counterpoise however being composed of steel. The free end portion of the finger 42 may be rubber covered to improve its operation in the obstructing of the air jets from valves 40, 41.

As previously stated, one end of the annular elastic work piece 17 is trained over a roller 16 upon the end of extension 15 of the beam A. The other end of the work piece is trained about a roller 45 that projects from a vertical rod 46, the lower end of the latter being connected to suitable mechanism (not shown) by means of which said rod may be axially adjusted as required. The arrangement is such that the work piece is placed under determinate tension when the rod 46 is in its lowermost position as shown in Fig. I. While the work piece is being tested, it is desirable that it be maintained at constant determinate temperature, and to this end the work piece is positioned within an enclosure 47, and heated air is forced into said enclosure by means of a motor-driven blower 48. The extension 15 of the beam arm extends into the enclosure 47 through a slot in the side thereof, and the rod 46 extends through a suitable aperture in the bottom of said enclosure. It will be obvious that the apparatus may be arranged to test work pieces of other constructions than the annular construction shown.

It is desirable that the mounting of the work piece 17 should not produce oscillation of the balance beam A, and this result is accomplished by the lifting of the balance beam off its pivot during the said operations. To this end a fluid pressure operated device 52 is mounted atop the framework of housing 10 and has its movable element connected to one end of a lever 53 that is suitably fulcrumed intermediate its ends and has its other end connected to the top of formation 13a of the beam through the agency of a link 54. The arrangement is such that charging of the device 52 will lift the balance beam A off its pivot.

In the operation of the apparatus, the beam A is lifted off its pivot in the manner described while an endless elastic work piece is stretched about the rollers 16 and 45. As soon as the work piece is in place, the device 52 is exhausted so as to lower the balance beam A onto its pivot, and the pneumatic motor automatically functions to move the counterpoise 22 along the beam until equilibrium thereof is established. The position of the counterpoise when equilibrium is established is indication of the tensile properties of the work piece.

The balance mechanism is extremely sensitive, and the balancing thereof is effected automatically. The invention saves time and labor in the testing of elastic work pieces, and achieves the other advantages set out in the foregoing statement of objects.

Modification may be resorted to without departing from the spirit of the invention, or the scope thereof as defined by the appended claims.

What is claimed is:

1. In a testing apparatus the combination of a frame, a balance beam fulcrumed thereon, means for connecting an elastic work piece to one end of said beam, a counterpoise movable along the opposite end portion of the beam, mechanical means for propelling said counterpoise, and a reversible rotary air motor for operating said mechanical propelling means, the rotor only of said air motor being carried by said beam, the remainder thereof being carried by said frame.

2. In a device of the character described, the combination of a frame, a balance beam fulcrumed thereon, a counterpoise on the beam movable longitudinally thereof, and means operatively connected to the counterpoise for propelling the same, said means comprising a reversible rotary air motor of which the rotor alone is carried by the beam.

3. In a device of the character described the combination of a frame, a balance beam fulcrumed intermediate its ends thereon, a counterpoise on the beam movable longitudinally thereof, a rotatable shaft carried by said beam, means operatively connecting said shaft to said counterpoise whereby the latter is moved back and forth along the beam in accordance with the direction of rotation of said shaft, and a reversible rotary air motor for rotating said shaft, the rotor of said motor being mounted on said shaft, the means for impelling said rotor being separate in its entirety from said beam.

4. In a device of the character described, the combination of a balance beam fulcrumed intermediate its ends, a counterpoise thereon movable longitudinally thereof, a shaft carried by said beam, a paddle wheel on said shaft, means mechanically separate in its entirety from the beam for directing jets of air under pressure against said paddle wheel, alternatively from different directions, to rotate the shaft in opposite directions, and means operatively connecting the shaft to the counterpoise so as to move the latter along the beam.

5. In a device of the character described, the combination of a balance beam fulcrumed intermediate its ends, a counterpoise thereon movable longitudinally thereof, a rotatable shaft carried by said beam, a paddle wheel carried by said shaft, a pair of fluid pressure nozzles positioned in spaced relation to said beam and directed at said paddle wheel from different directions, means operatively connecting the shaft to said counterpoise for moving the latter in different directions according to the direction of rotation of the shaft, and control means operated by the beam in different angular positions thereof for effecting the discharge of fluid pressure from one or the other of said nozzles.

6. A combination as defined in claim 5 wherein the paddle wheel comprises two sets of non-radial vanes, and the respective nozzles are angularly directed in determinate relation to the inclination of said sets of vanes.

7. In a device of the character described, the combination of a balance beam fulcrumed intermediate its ends, a counterpoise movable longitudinally thereof, a shaft carried by said beam, means operatively connecting said shaft to said counterpoise whereby the latter is moved along the beam by rotation of said shaft, a paddle wheel on said shaft, a pair of fluid pressure nozzles in spaced relation to said beam and directed at said paddle wheel from different angles, a pair of opposed pilot valves modulating the discharge of air from the respective nozzles, and means carried by the beam for operating said pilot valves alternatively, and to a degree proportional to the extent of off-balance of the beam.

8. In a device of the character described, the combination of a frame, a balance beam fulcrumed intermediate its ends on said frame, a counterpoise thereon movable longitudinally thereof, mechanical means including a rotatable shaft carried by the beam for propelling said counterpoise, reversible rotary air motor having its rotor only carried by the beam and connected to said shaft to rotate the latter, the remainder of the motor being carried by said frame, and means controlled by the angular position of the beam for controlling the direction of rotation of said rotor.

9. In a device of the character described, the combination of a frame, a balance beam fulcrumed intermediate its ends in said frame, a counterpoise mounted upon one end portion of the beam and movable longitudinally thereof, an endless cable to which said counterpoise is connected, a pair of pulleys carried by the beam and about which said cable is trained, and a reversible rotary air motor for driving one of said pulleys, at least, alternatively in opposite directions, the rotor only of said motor being carried by the beam, the remainder of the motor being carried by said frame.

GEORGE P. BOSOMWORTH.